United States Patent [19]

Dabisch

[11] 4,268,413
[45] May 19, 1981

[54] BODIES WITH REVERSIBLY VARIABLE TEMPERATURE-DEPENDENT LIGHT ABSORBENCE

[76] Inventor: Wolfgang Dabisch, Groosstr.11, 6228 Eltville, Fed. Rep. of Germany

[21] Appl. No.: 932,126

[22] Filed: Aug. 9, 1978

[30] Foreign Application Priority Data

Aug. 25, 1977 [DE] Fed. Rep. of Germany ....... 2738253

[51] Int. Cl.$^3$ ..................... G01K 11/06; G01K 11/16; G01K 11/18; C09K 3/00
[52] U.S. Cl. ..................... 252/408; 73/356; 73/358; 116/207; 116/216; 116/217; 252/300; 428/67; 428/323; 428/542
[58] Field of Search ............... 73/356, 358; 116/207, 116/216, 217; 252/408; 23/230 R; 428/67, 323, 542

[56] References Cited

U.S. PATENT DOCUMENTS

| | | | |
|---|---|---|---|
| 2,261,473 | 11/1941 | Jennings | 73/356 |
| 2,269,038 | 1/1942 | Perry | 73/358 |
| 2,928,791 | 3/1960 | Loconti | 252/408 |
| 3,585,259 | 6/1971 | Lefferts et al. | 252/408 |
| 3,620,889 | 11/1971 | Baltzer | 252/408 |
| 3,845,662 | 11/1974 | Surgina et al. | 73/358 |
| 3,956,153 | 5/1976 | Chadha | 252/408 |
| 3,980,581 | 9/1976 | Godsey, Jr. et al. | 252/408 |
| 4,022,706 | 5/1977 | Davis | 73/356 |
| 4,142,416 | 3/1979 | Smith et al. | 252/408 |
| 4,150,572 | 4/1979 | Lindquist | 73/356 |
| 4,154,106 | 5/1979 | Inoue et al. | 73/358 |

FOREIGN PATENT DOCUMENTS

| | | | |
|---|---|---|---|
| 1244391 | 8/1969 | Fed. Rep. of Germany | 73/356 |
| 1812319 | 6/1970 | Fed. Rep. of Germany | 73/356 |
| 2154042 | 5/1972 | Fed. Rep. of Germany | 73/356 |
| 2318287 | 10/1974 | Fed. Rep. of Germany | 73/358 |
| 1367703 | 9/1974 | United Kingdom | 73/356 |
| 271070 | 8/1970 | U.S.S.R. | 73/356 |

Primary Examiner—Teddy S. Gron
Attorney, Agent, or Firm—Biebel, French & Nauman

[57] ABSTRACT

In order, in the case of bodies with reversibly-variable absorbence, to adjust the zone of transition from transparent to opaque or vice versa at desired goal temperatures and to give the bodies a preferred form, such as sheet form, they consist of a substantially optically transparent polymeric and/or resinous matrix material (A) and an organic substance (B) which is embedded therein as a dispersed second phase and which is at least partially insoluble therein, and which melts or congeals at the goal temperature of light-absorbence variation, and the refractive index of which, either above or below the goal temperature of the light-absorbence variation, substantially agrees with the refractive index of the matrix material.

Such bodies are usable in sheet (or film) form, for example, for temperature-measuring devices, temperature-indicating devices, and slippery-ice warning devices, as well as for devices on glass windows for protection against solar irradiation.

12 Claims, No Drawings

BODIES WITH REVERSIBLY VARIABLE TEMPERATURE-DEPENDENT LIGHT ABSORBENCE

BACKGROUND OF THE INVENTION

The invention relates to bodies with reversibly variable temperature-dependent light absorbence. These are suited for determining temperature, measuring temperature, and temperature data like, for example, frost warning devices, slippery ice warning devices, devices for absorbing radiation of the sun, also for greenhouses, industrial structures, office and dwelling space, vehicles, etc., as well as for temperature indication in technical devices and apparatus.

Bodies with reversibly variable temperature-dependent permeability to light are known from German Pat. No. 1,244,391 and German published patent application No. 2,154,042, which bodies consist of reversibly thermocoagulable synthetic substances, hydrate salts and, if necessary, water, or of hydrated polymers and/or copolymers of n-vinyl lactamens. In such bodies, the hydrate salts or hydrated synthetic substances give off water when a specific temperature is exceeded, which water is dispersed in small droplets in the synthetic substance and thus produces turbidity of the body. The disadvantage of such bodies with reversible temperature dependence resides in the fact that they exhibit variation in light absorbence only upon being heated to relatively high temperatures; that always a transition from a transparent state to an opaque state is possible only in one direction, that the reversibility of variation in light absorption is dependent on atmospheric moisture; and that no sharp sudden change in transparency occurs.

Further, from German published patent application No. 1,812,319 is known a reflector for slippery ice warning devices which consists of a fluid in a capsule, the congelation point of this fluid being so adjusted that it congeals densely above the freezing point of water and thus loses permeability to light. Such reflectors are relatively expensive and are not suited to be installed on street guide-posts. They are susceptible to breakage, since the capsules shatter in collisons or from wanton mishandling, and the fluid can run out; and finally, they have the disadvantage that because of their nature they are not suited to keep the frost warning indicators invisible in non-dangerous temperature ranges and make them visible only in the warning range.

The problem forming the basis of the invention, consequently, resided in acquiring new bodies with reversibly variable temperature-dependent light absorbence in which, as required, a transition from transparent to opaque or from opaque to transparent can be attained and the variability in light absorbence to almost any desired temperatures. A special problem resides in creating such bodies with reversibly variable temperature-dependent light absorbence which can be used as frost-indicating devices or slippery ice warning devices and change from opaque to transparent in the vicinity of the freezing point of water and thus, in case of frost or slippery ice, permit warning symbols, become visible or, if they themselves are formed as warning symbols, become visible by reason of turbidity. A further problem resides in obtaining such bodies in which the transition from transparent to opaque or vice versa is as sharp as possible; which are neither dependent on atmospheric conditions like atmospheric moisture nor susceptible to destruction; and which can be produced and installed as simply as possible and in abundance. Still a further problem resides in being able to give such bodies a preferred form, such as that of films (or foils, or sheets).

SUMMARY OF THE INVENTION

The bodies according to the invention with reversibly variable temperature-dependent light absorbence made at least of a polymer material and/or resin material are characterized by the fact that in a substantially optically transparent polymer material and/or resin matrix material (A) they contain an organic substance (B) at least partially insoluble in the latter, which, after being embedded in the matrix material, melts or congeals at the goal temperature of light absorbence variation, and whose refractive index either above or below the temperature of light-absorbence variation substantially agrees with the refractive index of the matrix material, as a dispersed embedded second phase.

When mention is made here of "absorbence", this concept is intended to include the effects not only of absorption and scattering but also of refraction and reflection. The concept "light" signifies electromagnetic waves not only in the visible range but also, if occasion arises, in the ultra-violet or infra-red range. Finally, when the organic substance (B) is defined as being at least partially insoluble in the polymer material and/or resin matrix material (A), this is not intended to exclude the possibility that the substance (B) in the transparent state—that is, in a state of high light transmission—can also be present in real solution in the matrix material.

In temperature variations, these bodies according to the invention show, at a predetermined temperature, a reversible sudden change from transparent to opaque or from opaque to transparent. In other words, at a predetermined temperature, these bodies possess a relatively sharp sudden change from optical absorbence to high light transmission, or vice versa. This procedure is unlimitedly reversible and is independent of any sort of atmospheric conditions.

Such bodies can be used, for example, for temperature-measuring devices or warning devices. For example, they can be utilized as slippery ice warning devices if the desired temperature is set slightly above the freezing point of water. Here it is appropriate to use such substances for the matrix material, and also for the embedded organic substance, that, upon alteration of light absorbence when the temperature falls below the desired temperature, a transition from opaque to light-transmitting takes place; that is, the organic substance (B), after being embedded in the matrix material, melts slightly above the freezing point of water and in the solid state has a refractive index which agrees as well as possible with that of the matrix material.

Another area of application consists in temperature warning systems; that is, for indicating an excess temperature in areas or receptacles which must be kept at a specific temperature, as in air-conditioned areas, cold-storage rooms, or freezer compartments. In this case, it is appropriate, when the organic substance B, which is embedded in the matrix material and which has to melt at the desired temperature of light-absorbence variation, has a refractive index in the molten state which agrees as well as possible with that of the matrix material, since, when the desired temperature is exceeded, an alteration in state from opaque to transparent occurs, and warning signals, which lie behind the body and which are not legible in the normal state, become visible.

Another application is that of screening (or shielding) devices for solar and heat radiation for greenhouses, hotbeds, industrial structures, office windows and windows in dwelling houses, vehicle windows, and the like.

DETAILED DESCRIPTION OF THE PREFERRED EMBODIMENTS

For this application, the substances are so selected that, when the temperature falls below a determined desired temperature, the organic substance (B) embedded in the matrix material melts and in the molten state has a refractive index substantially different from the refractive index of the matrix material; in the solid state, on the other hand, has a refractive index which agrees as well as possible with the refractive index of the matrix material. In this case, the body according to the invention is transparent below the desired temperature but becomes turbid abruptly when the desired temperature is exceeded and then acts as a shield against further solar or heat irradiation. A more sensitive reaction of the thermo-functional body to solar irradiation can be obtained, for example, in that dark—preferably black—spots of color are placed on this body. If the thermo-functional body in the transparent state is exposed to solar radiation, the spots of color, which cover only a small portion of the surface of the thermo-functional body, become heated particularly rapidly through absorption of radiation. This heat is transmitted by means of heat conduction in the longitudinal direction of the body to adjacent points, whereupon these points, because of the heightened temperature, change over into the scattering, absorbing state. Now in this state, more radiation is again absorbed, the heat thus originating is conducted further, and so on.

When mention is made here of "bodies", this expression signifies any sort of molded article, like plates, sheets, lamina, blocks, or devices of any desired form; also coatings on other objects, as on sheets of synthetic (or plastic) material, plastic (or synthetic) plates, or glass plates. Since the matrix material consists of a synthetic (or plastic) material or of synthetic resin, it can be formed in any manner. However, it is especially appropriate if the bodies according to the invention are present in the form of sheets or coatings on transparent objects like glass plates or plates or sheets of synthetic material.

When mention is made above that the organic substance (B), which is embedded in the matrix material (A) and which is at least partially insoluble in the latter, is supposed to melt or congeal at the goal temperature of variation in light absorbence after being embedded in this matrix material, this is intended to express that this melting or congealing point does not compulsorily have to agree with the melting or congealing point of the pure organic substance (B). Usually, this melting or congealing point of the organic substance (B), after it is embedded in the matrix material (A), lies a few Celsius degrees below that of the pure organic substance (B), the deviation being dependent on the process by means of which the organic substance (B) is united with the matrix material (A). When the organic substance (B) is united with the dissolved or molten matrix material (A), the deviation of the melting point usually lies within a range of 5 degrees Celsius, while in cases where the matrix material is polymerized from its monomers and a mixture of the same with organic substance (B), the deviation can amount to up to 20 Celsius degrees. However, for an expert, it is simple to determine, with the aid of a few experiments, how the melting point becomes lowered with a given method and the working of the organic substance into the matrix material, and with the selection of a specific matrix material and a specific organic substance. Therefore, in the selection of the organic substances (B), usually one would employ a compound or a mixture of compounds which, as such, melts a few Celcius degrees above the goal temperature, so that the goal temperature is attained as closely as possible, upon melting, through lowering of the melting point upon working the organic substance into the matrix material (A).

It also goes without saying that melting of the organic substance (B) can and may take place over a limited range of temperature; however, the goal temperature must fall within this melting range or congealing range.

The refractive index of the embedded organic substance (B) should substantially agree, either above or below the goal temperature of light absorbence variation, with the refractive index of the matrix material. This signifies that no complete identity is required. However, the better this agreement, the sharper is the light absorbence variation, and the more transparent the body is, either above or below the goal temperature.

The sharpness of the effect—that is, the variation of light absorbence—also depends on how strongly the refractive index of the organic substance varies with phase alteration; that is, with transition from solid to liquid or vice versa. In order to obtain an effect utilizable in practice, it is suitable that this alteration of the refractive index of the organic substance (B) upon its phase alteration amount to at least 2%, preferably at least 5%, of the initial value.

The organic substance (B) is embedded in the matrix material (A) as a second—that is, discrete—phase and is suitably finely divided in the form of small to very small droplets or crystallites, preferably in the order of size of, or smaller than, the wavelength of light, the droplets converting into crystallites or the crystallites converting into droplets upon alteration of light absorbence. The degree of fineness of division of the organic substance in the matrix material can be adjusted according to the effect desired and the purpose of use.

The organic substance (B) can be worked into the matrix material in various ways and can be finely distributed therein. One method consists in mixing monomers and/or oligomers and/or prepolymers of the matrix material (A) with the organic substance (B) and, if necessary, adding a hardener for the monomers, oligomers, or prepolymers and polymerizing this mixture, forming and shaping the matrix material. The organic substance (B) may be present, completely dissolved, in the monomers, oligomers, or prepolymers of the matrix material until incompatibility or difficulty of solubility or phase separation takes place at any point in time during polymerization, so that then the matrix material and the organic substance are actually present in the end product as two separate phases, of which the organic substance (B) is the inner or dispersed phase, which usually is dispersed in more or less finely divided form in the matrix phase.

Another method consists of mixing the organic substance (B) with a solution of the matrix material in an organic solvent and finally evaporating the solvent, giving form to the matrix material. Here also, in dissolving, the organic substance can be entirely dissolved in the common solution but must precipitate (or deposit) in fine-particles form as the second phase upon evaporation of the solvent. It goes without saying that it is also possible so to select the substances that the organic substance (B) does not, on the whole, dissolve completely in the solution of matrix material but rather always remains dispersed therein as the second phase; care must be taken to achieve a fine-particle dispersion in the form of little droplets or crystallites, possibly by means of efficient stirring devices, ultra-sound, or effective comminution of the solid material.

A further method consists in melting the matrix material, then admixing or dispersing the organic substance (B) and finally, after the mixture has become uniform, cooling the matrix material off to give it form.

"Giving form" can consist of allowing the matrix material, with the organic substance (B) finely distributed therein, to polymerize, harden, or congeal in a form; shaping the matrix material in customary extruders with mouthpieces into sheets or plates or other molded articles; or using other customary forming processes, such as sheet-forming processes; or allowing the matrix material to form as a coating on another transparent body like a glass plate, and polymerizing, or allowing a coating to form on this transparent body, like a glass plate, by evaporation of the solvent or by congelation. Basically, all forming processes can be employed, since the matrix material is a polymer material or a resin material, giving form to which is known.

The matrix materials may be thermoplastic or duroplastic synthetic materials, or natural or synthetic resins; they can harden to elastomers or rigid bodies; or even, within a certain extent, may remain plastic or adhesive, as in the case of specific resinous matrix materials, for example. In this case and often in other cases, it is suitable to enclose the matrix material, sandwich-like, between other transparent bodies like glass plates or sheets of plastic (or synthetic) material.

The most varied classes of materials may be employed as matrix materials, selection being made especially on one hand according to the refractive index and on the other hand according to the physical properties required for a special purpose of use. Thus it may be desired that the matrix material produce a rigid sheet or plate, for being attached to street guide posts as slippery ice warning devices, for example. However, it may also be desired that the matrix material produce a flexible sheet or an adhesive or plastic coating. On the basis of the conditions outlined above for the matrix material, it is easy for an expert to select, from the multitude of known polymers and resins, a suitable resinous material for a specific organic substance, or vice versa. For example, suitable matrix materials are polyesters, polyamides, polystyrol, polyacrylates, and polymethacrylates, as well as silicon resins. Among the polyesters, the high-molecular linear saturated polyesters, particularly such with molecular weights of 10,000 to 20,000, are especially suitable. A suitable matrix material is also a polyvinylidene chloride acrylonitrile copolymer which contains substantially no branchings (or ramifications) and unsaturatednesses.

It is favorable to keep the weight ratio of organic substance (B) to matrix material (A) within the range of 1:3 to 1:16, preferably from 1:6 to 1:12, so that 3 to 16, preferably 6 to 12, parts by weight of matrix material will exist to 1 part by weight of the organic substance (B).

Examples of suitable organic substances (B) are alkanols, alkandiols, halogen alkanols or alkandiols, alkylamines, alkanes, alkenes, alkines, halogen alkanes, alkenes, or alkines, saturated or unsaturated monocarboxylic or dicarboxylic acids or esters or amides of the same saturated or unsaturated halogen fatty acids or esters or amides of the same, arylcarboxylic acids or their esters or amides, thioalcohols, thiocarboxylic acids or their esters or amides, or carboxylic acid esters of thioalcohols, as well as mixtures of the same, all of these compounds containing, appropriately, 10 to 40, preferably 10 to 30, carbon atoms. In the esters, the alcohol groups, for their part, may be saturated or unsaturated and/or halogen-substituted. The halogen atoms in these compounds are, suitably, chlorine or bromine, especially chlorine. Particularly favorable have been found to be such compounds as organic substance (B), which contain at least one straight-chain aliphatic group, suitably with 10 to 30 carbon atoms. In the aryl compounds, the aryl group is preferably phenyl or substituted phenyl. Through suitable selection of the organic substance (B), the hysteresis of the body according to the invention with reversible temperature-dependent transparency can be adjusted as desired; that is, by the reversible alternation between solid and liquid state of the embedded organic substance (B), one can obtain a temperature difference between melting and congealing or a temperature difference of the variation in light absorbence in hearing or cooling. A relatively large hysteresis—that is, such a temperature difference of a few degrees Celsius—is desired, for example, in the application of the invention to slippery ice warning devices. In this way it happens that the embedded organic substance (B) melts somewhat above its congealing point, so that the slippery ice warning still remains visible at temperatures at which normally no slippery ice will occur but can still be found locally in certain unfavorable spots.

In order to obtain as small a hysteresis as possible, one uses, suitably, compounds with heteroatoms, like halogen, nitrogen, oxygen, and sulfur, as the organic substance (B).

A few organic substances incline toward the formation of undercooled melting. When it is desired to prevent this, it can be appropriate to add crystallization nuclei in the form of organic or inorganic crystallites to the organic substance (B), such as pulverized quartz, basalt, mica, or benzamide crystals. Such crystallization nuclei effect spontaneous crystallization at the goal temperature of the light-absorbence variation.

In being employed as temperature-measuring or temperature-warning systems, the bodies according to the invention can be used as a coating, a sheet, a plate, or other molded article in front of a panel with a print of a symbol, a specific color panel, a symbol, or a reflector, so that above or below the point of light-absorbence variation a type character, a specific color, a symbol, or a reflection when irradiated with vehicle headlights, becomes visible. The print may, for example, be a specific temperature indication or the words "slippery ice" or the like.

It goes without saying that it is also possible to employ a combination of materials in which the dispersed substance (B) has the same refractive index, above its phase conversion point, as that of the resin matrix material (A) but below that point has a refractive index different from that of the resin matrix material (A). The thermofunctional body so obtained becomes opaque white in the warning range and forms a very clear contrast to a dark or reflecting background. A thickness of the thermofunctional layer of only 0.005 to 0.050 mm. suffices to attain an effective contrast. When the layer is placed on a thin, possibly self-adhesive film carrier, any preferred letters or symbols can be stamped (or punched, or blanked) out without difficulty, which are very insensitive and worth the price and have a small heat capacity because of their small volume and therefore permit an almost inertialess adaptation to varying temperatures.

In cases of use as solar radiation shields or heat-radiation shields, the body according to the invention consists of a coating on or between disks of window glass.

The following examples serve for further explanation of the invention.

EXAMPLE 1

10 parts by weight of a silicon resin, free from solvent, with a refractive index $n_{10}{}^D = 1.43$ ("Sylgard 184 encapsulating agent" of the Dow Chemical firm) is stirred to homogeneity with 1 part by weight of hardener ("Sylgard 184 curing agent" of the Dow Chemical Firm). 5 parts by weight of this mixture is treated with 1 part by weight of octadecanic acid pentyl ester with a refractive index $n_{10}{}^D = 1.45$ and $n_0{}^D$, again stirred to homogeneity, and coated in a layer 0.5 mm. thick on a glass plate. After four hours' hardening of the silicon resin at 65 degrees Centigrade, there originates a reversible thermofunctional layer which shows good transparency above 5 degrees Centigrade and a strong opacity (light absorbence) below 5 degrees Centigrade.

EXAMPLE 2

3 parts by weight of thermoplastic polyamide resin—namely, a condensation product of polymeric fatty acids with aliphatic diamines (Versalon 1175 of the firm Schering AG) is melted at 150 degrees Centigrade. With this melt is stirred 1 part by weight of heptanic acid tetradecyl ester, and the melt is coated in a 0.1-mm.-thick layer on a glass plate. After cooling to room temperature, there originates a reversibly thermofunctional layer, which shows opacity above 7 degrees Centigrade and transparency below 7 degrees Centigrade.

EXAMPLE 3

One part of phenyl acetic acid stearylester is dissolved in 20 parts by weight of a 15% solution of a high-molecular, linear copolyester on the basis of aromatic dicarboxylic acid and aliphatic dioles ("Polyester Dynapol L 206" of the Dynamit Nobel firm) in trichloroethylene. With the aid of a wire wiper (or doctor), this solution is coated as a 0.05-mm.-thick sheet of polyterephthalic acid glycol ester in such a manner that a layer 0.02 mm. thick results after evaporation of the solvent. The layer of thermofunctional transparency so produced shows opacity above 40 degrees Centigrade and transparency below 40 degrees Centigrade.

EXAMPLE 4

In 10 parts by weight of a 20% solution of a polyester on the basis of a mixture of aromatic as well as non-aromatic dicarboxylic acids and aliphatic dioles ("Polyester CR 04-178" of the Bostik firm, Oberursel) in trichloroethylene is dissolved one part of an intimate mixture of 10 parts of acetic acid heptadecyl ester, 10 parts of hexadecaneic acid heptylester, and 1 part of octadecanic acid octadecanic acid octadecyl ester (as crystallization nucleus). With the aid of a wire doctor (or wiper), this solution is spread as a 0.075-mm.-thick film of polyterephthalic acid glycol ester in such a manner that, after evaporation of the solvent, a layer 0.02 mm. thick results. The layer of temperature-dependent light absorbence so produced shows opacity above 18.0 degrees Centigrade and transparency below 17.3 degrees Centigrade. This narrow area between the conversion temperatures of heating or cooling is obtained by the addition of the octadecanic acid octadecyl ester as crystallization nucleus.

EXAMPLE 5

3 parts by weight of a thermoplastic polystyrol ("Hostyren N 2000" of the firm of Hoechst AB) is melted at about 160 degrees Centigrade. With this melt is stirred one part of heptanic acid tetradecyl ester, and the melt is coated as a layer 0.1 mm. thick on a glass plate. After cooling to room temperature there remains a reversibly thermofunctional layer which shows opacity above 7 degrees Centigrade and transparency below 7 degrees C.

EXAMPLE 6

4 parts by weight of a fusible polymethacrylate ("Plexigum P 28" of the firm of Röhm G. m. b. H, of Darmstadt) is melted at about 160 degrees Centigrade. With this melt is stirred 1 part by weight of Eicosan, and the melt is coated as a layer 0.07 mm. thick on a glass plate. After cooling to room temperature, there originates a layer, in accordance with the invention, which shows transparency above 35 degrees Centigrade and opacity below 35 degrees Centigrade.

EXAMPLE 7

9 parts by weight of a linear saturated copolyester with a refractive index $n_{25}{}^D = 1.52$ ("Polyester RFF-221 174" of the Bostik firm, Oberursell) is melted at about 160 degrees Centigrade. With this melt is stirred 1 part by weight of octadecane with a refractive index $n_{25}{}^D = 1.51$ and $n_{28}{}^D = 1.43$, and the melt is coated on a glass plate as a layer 0.1 mm. thick. After cooling to room temperature, the result is a reversibly thermofunctional layer in which the octadecane melts at 25 degrees Centigrade, so that the layer shows opacity above 25 degrees Centigrade and transparency below 25 degrees Centigrade.

While the article and method herein described constitute preferred embodiments of the invention, it is to be understood that the invention is not limited to this precise article or method, and that changes may be made therein without departing from the scope of the invention.

What is claimed is:

1. A body with reversibly variable temperature dependent light absorbence made of at least a polymeric or resinous material, comprising a substantially optically transparent polymeric or resinous matrix material (A), which contains, embedded as a dispersed second phase, at least one organic substance (B), which is at least partially insoluble in the former and which, after being embedded in the matrix material, melts or congeals at the goal temperature of light-absorbence variation, and the refractive index of which, either above or below the goal temperature of light-absorbence variation, agrees substantially with the refractive index of the matrix material.

2. A body according to claim 1 wherein said matrix material (A) contains embedded therein an organic substance (B) whose refractive index varies, upon phase alteration, by at least 2%.

3. A body according to claim 1 wherein said organic substance (B) is in the form of small droplets or crystallites finely distributed in the matrix material.

4. A body according to claim 1 wherein said organic substance (B) is present in a weight ratio to said matrix material (A) of 1:3 to 1:16.

5. A body according to claim 1 wherein said organic substance (B) is a material selected from the group consisting of alkanol, alkandiole, halogenated alkanol, halogenated alkandiole, alkylamine, alkane, alkene, alkine, halogenated alkane, halogenated alkene, halogenated alkine; a saturated monocarboxylic acid, unsaturated monocarboxylic acid, saturated dicarboxylic acid, unsaturated dicarboxylic acid or esters or amides thereof; a saturated halogenated fatty acid, unsaturated halogenated fatty acid, esters or amides thereof; an arylcarboxylic acid or esters or amides thereof; a thioalcohol; a thiocarboxylic acid, esters or amides thereof; and a carboxylic acid ester of a thioalcohol, each of which possesses 10 to 30 carbon atoms.

6. A body according to claim 1 wherein said organic substance (B) is a compound with at least one straight-line aliphatic group.

7. A body according to claim 1 wherein said matrix material (A) is selected from the group consisting of a polyacrylate, polymethacrylate, polystyrene, silicon resin, polyvinyl chloride, polyvinylidene chloride, and polyvinylidene chloride-acrylonitrile copolymer.

8. A body according to claim 1 wherein said organic substance (B) contains crystallization nuclei in the form or organic or inorganic crystallites which melt above the goal temperature of light-absorbence variation and, with the organic substance (B), forms no mixed crystallites.

9. The method of producing a body with reversibly variable temperature dependent light absorbence comprising the steps of:
(a) mixing in a substantially optically transparent polymeric or resinous matrix material (A) an organic substance (B) which is at least partially insoluble in said matrix material and which after being embedded in the matrix material, melts or congeals at the goal temperature of light-absorbence variation and the refractive index of which, either above or below the goal temperature of light-absorbence variation, agrees substantially with the refractive index of said matrix material, and
(b) forming said body of the mixture.

10. The method of claim 9 wherein said matrix material (A) is polymerizable when mixed with said organic substance (B) and is, then, polymerized in the forming step.

11. The method of claim 9 wherein said matrix material (A) is in an organic solution when mixed with said organic substance (B) and is, then, set by evaporation of said solvent in the forming step.

12. The method of claim 9 wherein said matrix material (A) is in the form of a melt when mixed with said organic substance (B) and is, then, cooled in the forming step.

* * * * *